No. 615,442. Patented Dec. 6, 1898.
H. H. FORSYTH.
SHADE HOLDING MECHANISM.
(Application filed June 9, 1898.)
(No Model.)
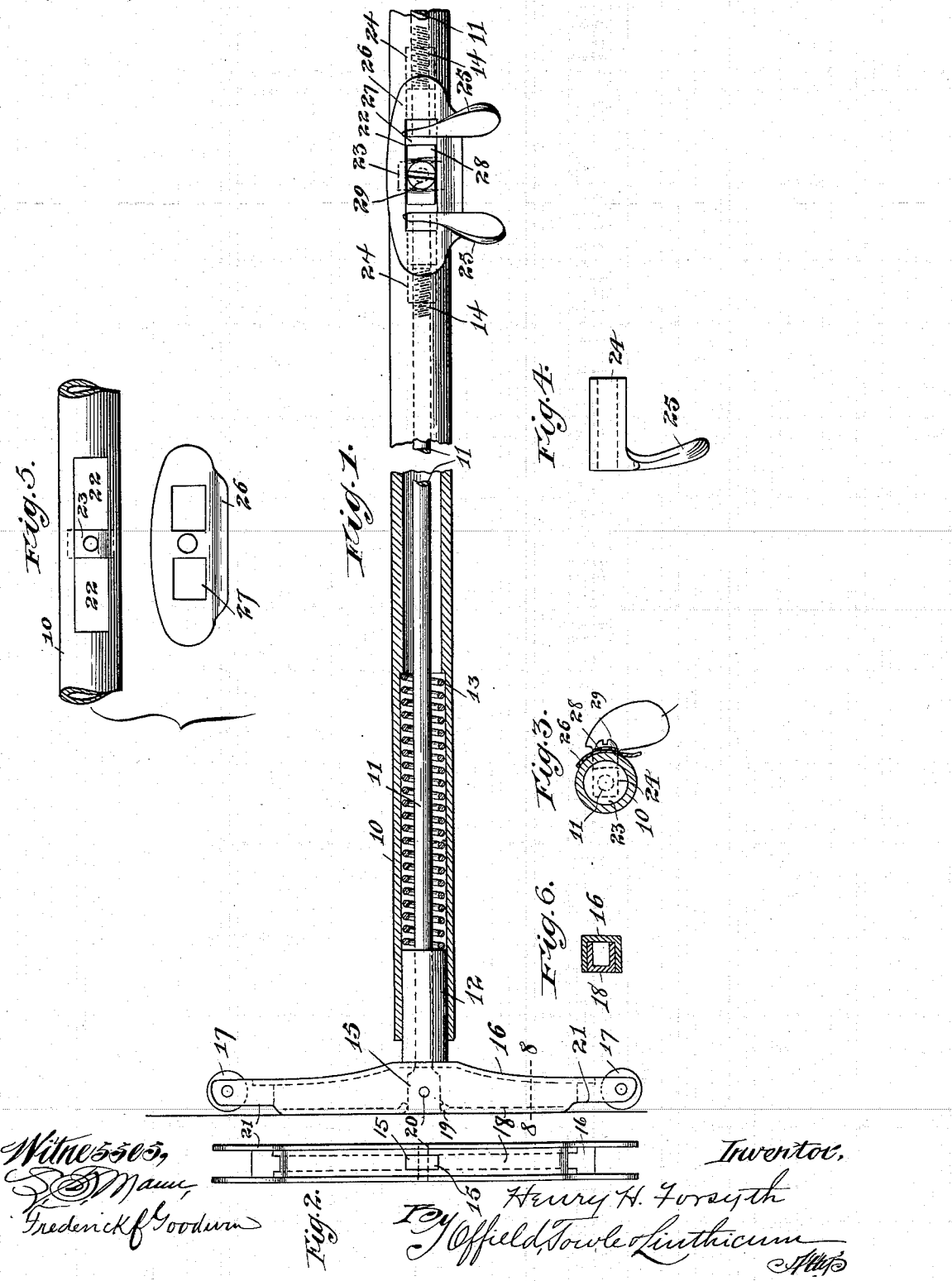

UNITED STATES PATENT OFFICE.

HENRY H. FORSYTH, OF CHICAGO, ILLINOIS.

SHADE-HOLDING MECHANISM.

SPECIFICATION forming part of Letters Patent No. 615,442, dated December 6, 1898.

Application filed June 9, 1898. Serial No. 682,975. (No model.)

*To all whom it may concern:*

Be it known that I, HENRY H. FORSYTH, of Chicago, in the county of Cook and State of Illinois, have invented certain new and useful Improvements in Shade-Holding Mechanism, of which the following is a specification.

This invention relates to that class of devices that are employed for holding spring-actuated shades at their lower ends, and more particularly to that class of shade-holding devices wherein spring-actuated rods are mounted within a tube or hollow shade-stick carried by the shade at its lower end, the friction-tips running within grooves in the window-frames and the sliding rods being provided with pendants by means of which the rods may be moved against the outward thrust of their springs and the friction-tips released, so as to permit the shade to be adjusted to desired positions. A shade-holding mechanism of this construction is shown in Letters Patent of the United States No. 524,060, granted to myself and others August 7, 1894, and in Letters Patent No. 559,446, granted to myself and another May 5, 1896. In the devices of said prior patents the spring-actuated rods carry friction tips or heads at their outer ends and have a threaded engagement with pendants at their inner ends. Said pendants protrude through slots in the tube in which the sliding rods are mounted and through openings in an escutcheon or cover-plate. In these said patented constructions means of adjustment are provided at the outer ends of the sliding rods, and the purpose of my present invention is to improve the means of adjustment by increasing its range and facility, whereby the fixture may be applied to windows of slightly-varying widths and adjusted thereto, so that the tips or heads will not bind or come out of the grooves in use. To accomplish this, the rods have at their inner ends a threaded connection with the pendants, said pendants having extended shanks in line with the rods and resting within the tube, said extended shanks being provided with threaded apertures to receive the rods, and the length of the threads being sufficient to give the capacity for required adjustment. The provisions particularly shown in said Patent No. 524,060 for preventing the rotation of the rods after they have been connected with the pendants I now omit, and instead of employing washers or split collars for adjusting the heads to provide for variations in the width, as shown in said Patent No. 559,446, I preferably use, as above stated, pendants with extended shanks having threaded apertures of considerable length, so as to secure all of the necessary or required adjustment. I also use an escutcheon or cover-plate having a slot in which the neck of the pendant moves, said slot being of such length relative to the length of the shank of the pendant that the latter may be passed through the slot of the cover-plate and inserted in the tube, and when the plate is secured to the tube the pendant will be prevented from falling out or becoming disconnected even if the rod be unscrewed therefrom. The tip or head is preferably secured rigidly to the rod, so that the separation of those parts is prevented and the adjustment of the rod in its pendant facilitated, and thereby my invention provides against the loss or misplacement of any of the parts in case of their becoming separated by accident or through the meddlesome interference of persons using the fixture.

My invention also includes a peculiar construction of the head or tip.

In the accompanying drawings, Figure 1 is a broken elevation, sectional through a portion of the tube. Fig. 2 is a face view of the friction tip or head, which is of that kind designated in the market as a "roller-tip." Fig. 3 is a transverse sectional view through the tube, showing one of the pendants in elevation, the cover-plate or escutcheon, and the bridge in section. Fig. 4 is a detached view of the pendant in side elevation. Fig. 5 is a detail view showing part of the tube and the cover-plate and the relative length of the slots therein, and Fig. 6 is a cross-section on the line 8 8 of Fig. 1.

The objects of my invention may be stated as follows: first, to provide a construction which will permit an adjustment of the fixture to the frame of the window, so that the fixture will work with the proper friction without binding and without coming out of the grooves; second, to provide an adjustable fixture whose parts while easily adjusted are not readily separated or detached from each other and if detached are not separated from the curtain, so as to become lost or misplaced, and, third, to provide a fixture of simple and economical construction having these desirable features.

In the drawings let 10 represent the tube to contain the sliding rods, which tube will be carried by the lower margin of the curtain. Within said tube are mounted the sliding rods 11, which are preferably each provided at their outer ends with a sleeve 12, fitting the bore of the tube and forming a guide to the rod in its movement.

13 represents springs, each having a bearing upon a shoulder of the tube and against the end of said sleeve, thereby tending to force the rod outwardly. The inner end of each rod is threaded, as shown at 14, and its outer end, extending beyond the sleeve 12, is flattened, as shown at 15, the flattened portion resting within the hollow body of the elongated metal head 16, carrying the antifriction-rollers 17 near its ends.

18 represents a metal shoe, of U form in cross-section, fitting snugly within the hollow head, as shown by the dotted lines in Fig. 1 and in the face view in Fig. 2. The shoe 18 may be apertured to receive the squared head 15, and the latter may be riveted down or headed over, as shown at 19, to secure the shoe, the rod, and the head together. A pin 20, passing through the head, the walls of the shoe, and the squared end of the rod, is also shown, and both the riveting and the pin or either may be employed for this purpose.

The body 16 of the tip is U-shaped in cross-section, and the shoe 18 is of similar but inverted shape in cross-section and serves not only to fit within and strengthen the body and at the same time present a frictional surface at the outer face of the body, but also to form a slot or recess in which the flattened end 15 of the rod 11 fits and is firmly held, while at the same time the tip is made lighter and cheaper by dispensing with a great portion of metal in the body of the tip and the tip is firmly and rigidly united to the rod.

I preferably cut away the head on its outer or bearing side adjacent to the wall, as shown at 21, so as to insure the engagement of the rollers 17 when the fixture is rocked to an abnormal position, in which position the anti-friction-rollers will come into bearing contact, and, being of less frictional holding power than the shoe, the fixture will automatically right itself.

The tube 10 is provided near its middle with slots 22, separated by a block 23, threaded to receive a fastening-screw. In Fig. 4 is shown the preferred form of pendant, consisting of an extended shank 24, provided with a longitudinal threaded aperture and a thumb-piece 25, extending at right angles from the shank. The shank is intended to be of such form as to enter through the slot 22 with its threaded aperture in line with the rod, with which it has threaded engagement. The elongation of the shanks gives ample range of adjustment to the tips, which may be screwed farther into or out of the shanks to vary the adjustment of the tips, while the rotation of the rods to effect this end may be readily effected by reason of the fact that the tips are rigidly secured to said rods instead of being swiveled thereon, as in the earlier constructions hereinbefore referred to.

26 represents the cover-plate, which is also provided with slots or openings 27, said slots or openings being adapted to register with the slots 22 of the tube. The cover-plate is perforated for the passage of a fastening-screw 29, whereby it may be secured after the parts of the fixture are put together. The slots 27 of the cover-plate are of such length with relation to the length of the shanks 24 that the latter cannot be withdrawn through the slots of the cover-plate when it is fastened to the tube.

To assemble the fixture, the shanks 24 are inserted through the slots 27 of the cover-plate and then entered through the slots in the tube. When the cover-plate is secured to the tube, the length of the shank will not permit it to pass through the slot 27, and therefore, even if the rod be unscrewed from the shank, the pendant will not fall out or become separated from the curtain.

I claim—

1. In a curtain-fixture of the class described, the combination, with a slotted tube, of a spring-actuated rod slidably mounted therein, a pendant comprising a thumb-piece and an elongated shank having a threaded aperture for engagement with the rod, and a slotted cover-plate through which the shank of the pendant may pass when said plate is free from the tube, the slot in the cover-plate being of such length relative to the length of the shank of the pendant as to prevent the passage of said shank through said slot when the cover-plate is secured to the tube, substantially as described.

2. In a curtain-fixture of the character described, the combination, with a slotted tube, of a spring-actuated rod slidably mounted therein threaded at its inner end and having a friction-tip rigidly secured at its outer end, a pendant having an elongated shank threaded to receive the inner end of the rod, and a slotted cover-plate through which the pendant passes, the slot in the cover-plate being of such length relative to the length of the pendant as to prevent the withdrawal of the latter therefrom when the cover-plate is secured to the tube, substantially as described.

3. In a curtain-fixture of the character described, the combination, with a slotted tube, of a pendant having a threaded shank within the tube, a slotted cover-plate to retain the pendant in position in the tube, a spring-actuated rod threaded at its inner end to engage the shank of the pendant and flattened at its outer end, and a tip or head having a metal body U-shaped in cross-section, and a
5 metallic shoe also U-shaped in cross-section fitting within said body in a reverse position and adapted to receive the flattened end of the rod which is secured therein, substantially as described.

HENRY H. FORSYTH.

Witnesses:
W. H. FORSYTH,
EMILY CASTERTON.